United States Patent
Ahn et al.

(10) Patent No.: US 11,961,217 B2
(45) Date of Patent: Apr. 16, 2024

(54) DEVICE AND METHOD FOR STORING IMAGE DATA FOR SURFACE DEFECT DETECTION SCANNER

(71) Applicant: Pusan National University Industry—University Cooperation Foundation, Busan (KR)

(72) Inventors: Sungyong Ahn, Daejeon (KR); Junseok Yang, Busan (KR)

(73) Assignee: Pusan National University Industry—University Cooperation Foundation, Busan (KR)

( * ) Notice: Subject to any disclaimer, the term of this patent is extended or adjusted under 35 U.S.C. 154(b) by 466 days.

(21) Appl. No.: 17/330,389

(22) Filed: May 25, 2021

(65) Prior Publication Data

US 2022/0207692 A1    Jun. 30, 2022

(30) Foreign Application Priority Data

Dec. 29, 2020    (KR) .................. 10-2020-0185967

(51) Int. Cl.
| | |
|---|---|
| *G06F 16/45* | (2019.01) |
| *G06F 18/24* | (2023.01) |
| *G06T 5/50* | (2006.01) |
| *G06T 7/00* | (2017.01) |
| *G06T 7/40* | (2017.01) |
| *G06T 7/70* | (2017.01) |

(52) U.S. Cl.
CPC ............ *G06T 7/0002* (2013.01); *G06F 18/24* (2023.01); *G06T 5/50* (2013.01); *G06T 7/40* (2013.01); *G06T 7/70* (2017.01); *G06T 2207/20221* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 9,805,166 B1 * | 10/2017 | Spaulding | G06F 16/48 |
| 10,607,331 B1 * | 3/2020 | Tandia | G06F 16/48 |
| 2010/0026822 A1 * | 2/2010 | Hahm | G06F 16/45 |
| 2021/0084315 A1 * | 3/2021 | Chen | G06F 16/45 |
| 2021/0303616 A1 * | 9/2021 | Fukada | G06F 16/164 |
| 2022/0180497 A1 * | 6/2022 | Scheidegger | G06F 16/45 |

FOREIGN PATENT DOCUMENTS

| | | |
|---|---|---|
| JP | 4703327 B2 | 3/2011 |
| JP | 2013-46219 A | 3/2013 |
| JP | 2013-250188 A | 12/2013 |
| KR | 10-2001-0002386 A | 1/2001 |
| KR | 10-2002-0019991 A | 3/2002 |
| KR | 10-2002-0055601 A | 7/2002 |
| KR | 10-0937543 B1 | 1/2010 |
| KR | 10-1122960 B1 | 3/2012 |
| KR | 10-1192118 B1 | 10/2012 |

(Continued)

*Primary Examiner* — Son T Hoang
(74) *Attorney, Agent, or Firm* — Park, Kim & Suh, LLC

(57) ABSTRACT

A storage device includes at least one processor. The at least one processor is configured to acquire a surface scan image in an image tile format of a set size, bind a set number of image tiles in one segment, and store a plurality of segments as files, respectively, instead of storing the image tiles without modification.

9 Claims, 4 Drawing Sheets

(56) References Cited

FOREIGN PATENT DOCUMENTS

| | | |
|---|---|---|
| KR | 10-1196409 B1 | 11/2012 |
| KR | 10-1638368 B1 | 7/2016 |
| KR | 10-1725605 B1 | 4/2017 |
| KR | 10-2017-0096711 A | 8/2017 |
| KR | 10-1850772 B1 | 4/2018 |
| KR | 10-1934313 B1 | 1/2019 |
| KR | 10-1939844 B1 | 1/2019 |
| KR | 10-2026888 B1 | 9/2019 |
| KR | 10-2020-0035182 A | 4/2020 |

* cited by examiner

DEVICE AND METHOD FOR STORING IMAGE DATA FOR SURFACE DEFECT DETECTION SCANNER

CROSS-REFERENCE TO RELATED APPLICATIONS

A claim for priority under 35 U.S.C. § 119 is made to Korean Patent Application No. 10-2020-0185967 filed on Dec. 29, 2020, in the Korean Intellectual Property Office, the entire contents of which are hereby incorporated by reference.

BACKGROUND

Embodiments of the inventive concept relate to a device and a method for storing image data scanned by a surface defect detection scanner and extracting the image data. This research was supported by the MSIT (Ministry of Science and ICT), Korea, under the Grand Information Technology Research Center support program (IITP-2021-2016-0-00318) supervised by the IITP (Institute for Information & communications Technology Planning & Evaluation).

A surface scan image of a surface defect detector is stored in image tiles of a specific size.

In existing software, the image tiles are stored in the form of connection lists, and thus it takes much time to read an image of a specific location. There is a method for storing the defect images in files but costs for the storage spaces increase due to a plurality of overlapping image tiles.

Korean Patent No. 1192118 discloses a technology for detecting a surface defect of a strip by using a plurality of lightings.

PRIOR TECHNICAL DOCUMENTS

Patent Documents

Korean Patent No. 1192118

SUMMARY

Embodiments of the inventive concept provide a storage device and a storage method for sufficiently securing a marginal storage space and supporting high-speed extraction of a defect image.

The technical problems that are to be solved by the inventive concept are not limited to the above-mentioned ones, and the other technical problems that have not been mentioned will be clearly understood from the following description by an ordinary person in the art, to which the inventive concept pertains.

According to an exemplary embodiment, a storage device includes at least one processor, wherein the at least one processor is configured to acquire a surface scan image in a format of image tiles of a set size, bind a set number of image tiles in one segment, and store a plurality of segments as files, respectively, instead of storing the image tiles without modification.

According to an embodiment of the inventive concept, the at least one processor may be configured to generate the files having location values of the segments for the surface scan image as a key and store the files.

According to an embodiment of the inventive concept, the image tiles may include pieces of location information, and the at least one processor may be configured to generate the files having at least one of the pieces of location information of the plurality of image tiles constituting the segments as a key value and store the files.

According to an embodiment of the inventive concept, the at least one processor may be configured to generate the files having location information of a specific image tile disposed at a set location of the segment as a file name and store the files.

According to an embodiment of the inventive concept, the at least one processor may be configured to arrange the plurality of image tiles in rows and columns according to the pieces of location information of the image tiles, bind the plurality of image tiles arranged in the rows and the columns by a row-directional set value and a column-directional set value to generate the segments, classify the pieces of location information of the specific image tiles disposed at the first left-uppermost locations of the segments into row locations and column locations, and generate the files such that the file names include first values obtained by dividing the row locations by the row-directional set value and second values obtained by dividing the column locations by the column-directional set value.

According to an embodiment of the inventive concept, the at least one processor may be configured to set the row-directional set value and the column-directional set value to be the same.

According to an embodiment of the inventive concept, the files generated and stored by the at least one processor may have location values of specific image tiles as keys, and the at least one processor may be configured to search for and extract a specific file containing a defect image by using a key value, and generate the defect image by using the extracted specific file.

According to an embodiment of the inventive concept, the at least one processor may be configured to store the files in a memory, and extract a specific file containing a defect image from the memory, and the at least one processor is configured to, when acquiring defect information containing a coordinate, extracting a file, in which a row defect location obtained by dividing a row-directional location of the coordinate by a row-directional set value and a column defect location obtained by dividing a column-directional location of the coordinate by a column-directional set value are contained in a name thereof, from the memory.

According to another exemplary embodiment, a storage method performed by a storage device including at least one processor includes binding a plurality of image tiles in one segment to store the image tiles as a file instead of storing surface scan images output from a surface defect detector in image tiles of set sizes, and enabling a name of the file to contain representative location information of the segments.

According to another exemplary embodiment, a storage method performed by a storage device including at least one processor includes acquiring, by the at least one processor, surface scan images output from a surface defect detector in a format of image tiles of a set size, arranging, by the at least one processor, the image tiles according to location information thereof and binding the plurality of image tiles, which are adjacent to each other, in a set size to generate segments, and storing, by the at least one processor, the segments as files, and a name of the file is set to represent location information of a specific image tile located at the first left-uppermost image tile contained in the segment.

According to an embodiment of the inventive concept, the storage method may further include, when acquiring location information containing a start location and a size of a defect image, extracting, by the at least one processor, a specific file containing the defect image by using the name of the file, and generating, by the at least one processor, the defect image by using the extracted specific file.

According to another exemplary embodiment, a non-transitory computer readable recording medium in which a computer program for executing the storage method is recorded is provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

The above and other aspects, features, and advantages of the inventive concept will become apparent from the following description of the following embodiments given in conjunction with the accompanying drawings. However, the inventive concept is not limited by the embodiments disclosed herein but will be realized in various different forms, and the embodiments are provided only to make the disclosure of the inventive concept complete and fully inform the scope of the inventive concept to an ordinary person in the art, to which the inventive concept pertains, and the inventive concept will be defined by the scope of the claims.

Although not defined, all the terms (including technical or scientific terms) used herein may have the same meanings that are generally accepted by the common technologies in the field to which the present invention pertains.

The terms defined by the general dictionaries may be construed to having the same meanings as those meant in the related technologies and/or the disclosure of the application, and will neither become conceptual nor be construed to be excessively formal even though not clearly defined herein.

The terms used herein are provided to describe the embodiments but not to limit the inventive concept. In the specification, the singular forms include plural forms unless particularly mentioned.

The expressions 'include' and/or its various conjugated forms, such as 'including', which are used in the specification do not exclude existence or addition of one or more compositions, substances, elements, steps, operations, and/or devices. In the specification, the term 'and/or' represents enumerated configurations or various combinations thereof.

Meanwhile, the terms 'part', '~er(or)', "module", and the like used in the specification may mean a unit for processing at least one function or operation. For example, they may mean software, and hardware elements such as an FPGA or an ASIC. However, the 'part', '~er(or)', "module", and the like are not limited to software or hardware. The 'unit', '~er(or)', and "module" may be constituted in a storage medium that may perform addressing, and may be configured to reproduce one or more processors.

Accordingly, as an example, the 'unit', '~er(or)', and "module" include elements such as software elements, object-oriented software elements, class elements, and task elements, processes, functions, attributes, procedures, subroutines, segments of a program code, drivers, firmware, micro-codes, circuits, data, a database, data structures, tables, arrays, and parameters. The elements and the functions provided in the 'unit', '~er(or)', and "module" may be coupled to a smaller number of elements and the 'unit', '~er(or)', and "module" or may be separated to additional elements and 'units', '~ers(ors)', and "modules".

Hereinafter, exemplary embodiments of the inventive concept will be described in detail with reference to the accompanying drawings of the specification.

Figure 1:
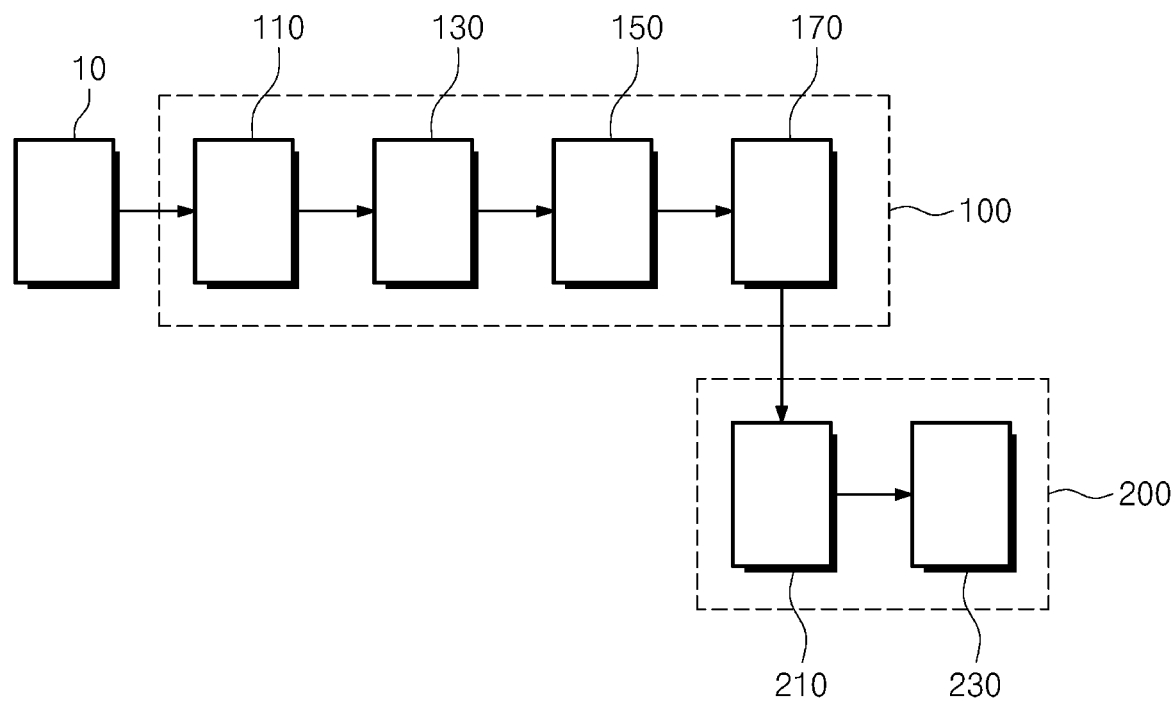
FIG. 1 is a schematic view illustrating a storage device of the inventive concept.
Figure 2:
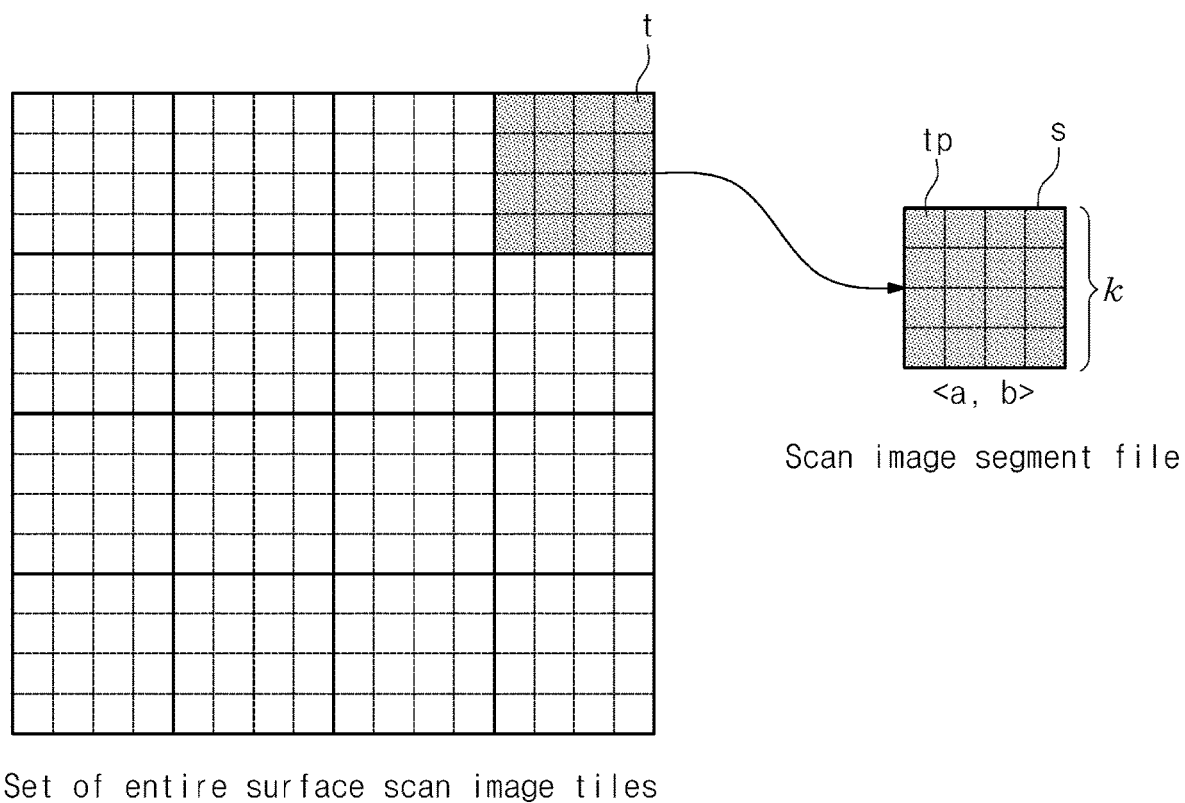
FIG. 2 is a schematic view illustrating segments.

FIG. 1 is a schematic view illustrating a storage device of the inventive concept. FIG. 2 is a schematic view illustrating segments.

The storage device illustrated in FIG. 1 may include a storage unit 100 that stores a surface scan image, and an extraction unit 200 that extracts a defect image from the surface scan image stored in the storage unit 100. The storage unit 100 and the extraction unit 200 may be formed integrally or separately.

The storage unit 100 may include an acquisition part 110, a segment part 130, a file part 150, and a storage part (a memory) 170.

The acquisition part 110 may acquire a surface scan image in the format of image tiles of a set size. In other words, the acquisition part 110 may acquire a plurality of image tiles "t" obtained by segmenting or dividing the entire surface scan image.

The acquisition part 110 may acquire the image tiles from a detector 10 that generates and outputs the surface scan image or acquire the image tiles from separate pre-processors. The acquisition part 110 may be provided with a communication module that communicates with the surface scan image or the pre-processor by wire or wirelessly.

The image tiles "t" may correspond to a storage format of the surface scan image generated and output by the detector 10 that scans a surface defect of an object. Accordingly, according to a comparative example, the image tiles "t" may be directly stored in a storage unit.

The segment part 130 may bind (group) a set number of image tiles "t" in one segment "s". When a segment "s" containing a plurality of image tiles "t" is prepared, the number of the segments "s" may be smaller than the number of the image tiles "t". Accordingly, when the surface scan image is managed in unit of not image tiles "t" but segments "s", loads for management, such as storage, extraction, and the like, may be reduced.

The file part 150 may not store the image tiles "t" as they are but store the plurality of segments "s" as files, respectively. As a measure for efficiently storing the segments "s" and promptly generating a specific defect image, the file part 150 may generate the files having location values of the segments for the surface scan image as a key and store the files.

As an example, the image tiles "t" may include pieces of location information. Then, the file part 150 may generate the files having at least one of the pieces of location information of the plurality of image tiles constituting the segments "s" as a key value and store the files. The corresponding key value, for example, may correspond to a file name. In this case, the file part 150 may generate the files having location information of a specific image tile tp disposed at a set location of the segment as a file name and store the files.

If the pieces of location information of the image tiles "t" are contained in the file names, the file names may become complex and may require much search time. Accordingly, a measure for simplifying the file names without damaging the pieces of the location information of the image tiles "t" may be provided.

The segment "s" may include a plurality of image tiles "t". Then, a selection problem of determining which image tile "t" will be set to a key value of the segment "s", for example, to a file name may occur. As a measure for solving the corresponding problem by simplifying the file names, the file part 150 may enable the location information of the specific image tile tp disposed at the first left-uppermost location of the segment "s" to be contained in the file name.

In detail, the segment part 130 may arrange the plurality of image tiles "t" in rows and columns according to the pieces of location information of the image tiles "t" (a set of tiles of the entire surface scan image of FIG. 2').

The segment part 130 may bind the plurality of image tiles "t" arranged in rows and columns by a row-directional set value and a column-directional set value to generate the segment "s".

The file part 150 may classify the pieces of location information of the specific image tiles tp disposed at the first left-uppermost locations of the segments "s" into row locations and column locations.

The file part 150 may generate the files such that the file names include first values obtained by dividing the row locations of the specific image tiles tp by the row-directional set value and second values obtained by dividing the column locations of the specific image tiles tp by the column-directional set value. In FIG. 2, the file part 150 may set the row-directional set value and the column-directional set value to be the same value "k".

As an example, the row location and the column location of the specific image tile tp corresponding to the first image tile, which is the leftmost and uppermost image tile in the specific segment may be 12 and 20, respectively. Then, if k is 4, the file part 150 derive 12/4=3 as a first value and 20/4=5 as a second value. Furthermore, the file part 150 may set <3, 5> including both the first value and the second value as the file name of the specific segment.

According to the embodiment of the inventive concept, <12, 20> that represents the location of the specific image tile tp as it is may be used as the file name. In this case, the increment of the locations represented by the file names of the segments may be abruptly increased according to the row-directional set value and the column-directional set value.

For example, if the row-directional location and the column-directional set value of the first segment s1 are 12 and 4, respectively, the row-directional location of the second segment s2, which is immediately next to the first segment s1, may be 16. If the row-directional set value and the column-directional set value are directly applied as the increment, the file name corresponding to the location information also becomes longer due to the carry of the location information and the like.

As a measure for minimizing the length increment of the file name, according to the embodiment of the inventive concept, a value obtained by dividing the row-directional location by the row-directional set value or a value obtained by dividing the column-directional location by the column-directional set value may be used as a file name. In this case, the file name <12, 20> may be simplified to <3, 5> obtained by dividing <12, 20> by the row-directional set value of 4 and the column-directional set value of 4. Further, the location values that increase for the segments may be calibrated to the unit of '1'.

The file part 150 may store the file having the location value of the specific image tile as a key in the storage part 170. The storage part 170 may be formed integrally with the storage device or may be provided in a separate database.

Figure 3:
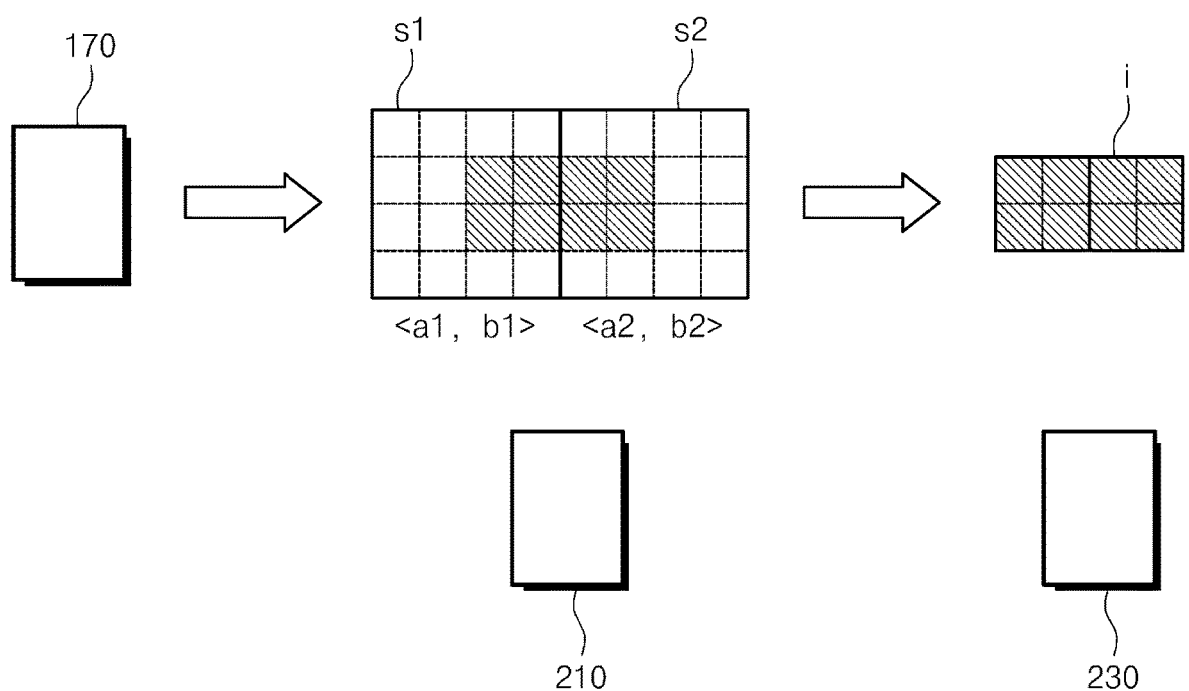
FIG. 3 is a schematic view illustrating an operation of an extraction unit.

FIG. 3 is a schematic view illustrating an operation of the extraction unit 200.

The extraction unit 200 may include an extraction part 210 and a generation part 230.

The extraction part 210 may search for a specific file containing a defect image "i" by using a key value and may extract the specific file from the storage part 170.

When acquiring defect information containing a coordinate from a terminal or the like, the extraction part 210 may extract a file having, in the file name, a row defect location obtained by dividing the row-directional location of the coordinate by the row-directional set value and a column defect location obtained by dividing the column-directional location of the coordinate by the column-directional set value, from the storage part 170.

The generation part 230 may generate the defect image "i" by using the extracted specific file.

As an example, the defect information containing the coordinate <x, y, w, h> may be acquired by the extraction part 210.

The extraction part 210 may acquire the row-directional set value and the column-directional set value from the file part 150. Alternatively, the extraction part 210 may know the values that are the same as the set values of the file part 150 through a previous promise. In the present embodiment, the row-directional set value and the column-directional set value may be the same value of 4.

The extraction part 210 may extract a file having the front digit of the decimal point of a value obtained by dividing the row-directional location "x" of the defect information by 4 and the front digit of the decimal point of a value obtained by dividing the column-directional location "y" of the defect information by 4 as a name, from the storage part 170. In FIG. 3, the corresponding file may correspond to the first segment s1.

The extraction part 210 may extract a file having the front digit of the decimal point of a value obtained by dividing the row-directional location x+w of the defect information by 4 and the front digit of the decimal point of a value obtained by dividing the column-directional location y+h of the defect information by 4 as a name, from the storage part 170. In FIG. 3, the corresponding file may correspond to the second segment s2. "w" may indicate the row-directional length of the defect image. "h" may indicate the column-directional length of the defect image.

If the first segment s1 and the second segment s2 are extracted, the generation part 230 may extract the defect image from the first segment s1 and the second segment s2 by using Equation 1 and configure it again.

$$a_{start} = \left[\frac{x}{k}\right]$$
$$a_{snd} = \left[\frac{(x+w)}{k}\right]$$
$$b_{start} = \left[\frac{y}{k}\right]$$

[Equation 1]

-continued $$b_{end} = \left\lceil \frac{(y+h)}{k} \right\rceil$$

$$a_{start} \leq a_i \leq a_{end}$$

$$b_{start} \leq b_j \leq b_{end}$$

Here, $a_i$ denotes the row-directional location of the file name, and $b_j$ denotes the column-directional location of the file name.

In Equation 1, $a_{start} \leq a_i \leq a_{end}1$ and $b_{start} \leq b_j \leq b_{end}$ may represent the area of the defect image.

Figure 4:
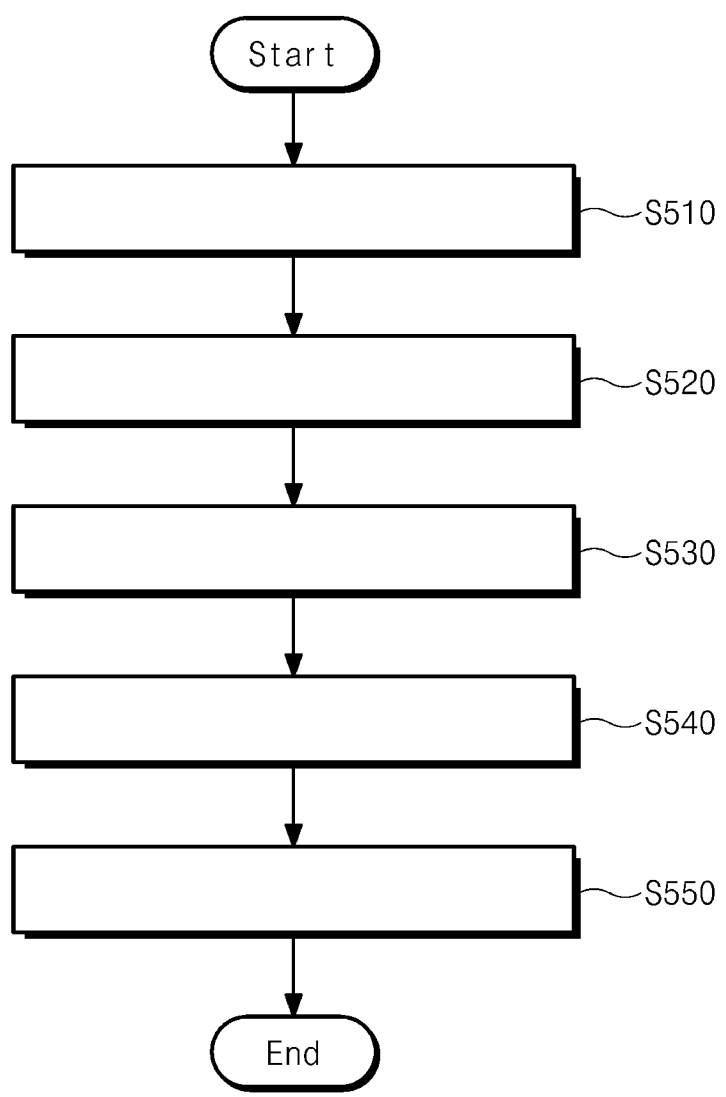
FIG. 4 is a flowchart illustrating a storage method of the inventive concept.

FIG. 4 is a flowchart illustrating a storage method of the inventive concept.

The storage method of FIG. 4 may be performed by the storage device illustrated in FIG. 1.

In the storage method of the inventive concept, instead of storing the surface scan image output from the surface defect detector 10 in the image tiles "t", the plurality of image files may be bound in one segment "s" and may be stored. The storage method of the inventive concept may include representative location information of the segment "s" in the name of the file.

In detail, the storage method of the inventive concept may be performed by the storage device, and may include an acquisition operation S510, a first generation operation S520, a storage operation S530, an extraction operation S540, and a second generation operation S550.

In the acquisition operation S510, the surface scan image output from the surface defect detector 10 may be acquired in the format of the image tiles of the set size. The acquisition operation S510 may be performed by the acquisition part 110.

In the first generation operation S520, the image tiles "t" may be arranged according to the location information, and the plurality of image tiles "t", which are adjacent to each other, may be bound to the set size to generate the segments "s". The first generation operation S520 may be performed by the segment part 130.

In the storage operation S530, the segments "s" may be stored as files. The storage operation S510 may be performed by the file part 150. The file part 150 may store the segments "s" in the storage part 170 in the format of files. The name of the file may be set to indicate the location information of the specific image tile tp located on the first left and upper image tile "t" contained in the segments.

As an example, when the location information of the tile tp is <4, 8>, the file name of the corresponding segment "s" may include <4, 8> or may include <1, 2> obtained by dividing the corresponding location information by the set value of 4.

If the location information containing the start location x, y and the size w, h of the defect image is acquired, in the extraction operation S540, the specific file containing the defect image "i" may be extracted by using the name of the file. The extraction operation S540 may be performed by the extraction part 210.

In the second generation operation S550, the defect image "i" may be configured again or generated by using the extracted specific file. The second generation operation S550 may be performed by the generation part 230.

Meanwhile, the embodiments of the inventive concept are not implemented only by the device and/or the method described until now, but may be implemented through a program that realizes the functions corresponding to the configuration of the embodiment of the inventive concept or a recording medium, in which the program is recorded, and the implementations may be made by an ordinary person in the art, to which the inventive concept pertains.

According to the inventive concept, when the location information (the start location (x, y) and the size (w, h) of the defect image) is given, the files containing the corresponding defect image "i" may be discovered with reference to the name of the files.

According to the storage device and the storage method of the inventive concept, the storage space of the scan image may be saved by storing only the actual scan image tiles that do not contain margins.

In addition, because the image tiles of the set size are grouped with reference to their coordinates, the image tiles containing the defect image may be promptly searched for and extracted. As a result, according to the inventive concept, the defect image may be promptly configured again.

The advantageous effects of the inventive concept are not limited to the above-mentioned ones, and the other advantageous effects will be clearly understood by an ordinary person skilled in the art to which the inventive concept pertains.

Although the inventive concept has been described through the embodiments until now, the above embodiments are provided only to describe the spirit of the inventive concept and the inventive concept is not limited thereto. It is noted that those skilled in the art may variously modify the embodiment. The scope of the inventive concept is determined only through the construction of the attached claims.

What is claimed is:

1. A storage device comprising:
at least one hardware processor,
wherein the at least one hardware processor is configured to:
    acquire a surface scan image in a format of image tiles of a set size;
    bind a set number of image tiles in one segment;
    store a plurality of segments as files, respectively, instead of storing the image tiles without modification;
    arrange the plurality of image tiles in rows and columns according to the pieces of location information of the image tiles;
    bind the plurality of image tiles arranged in the rows and the columns by a row-directional set value and a column-directional set value to generate the segments;
    classify the pieces of location information of the specific image tiles into row locations and column locations; and
    generate the files such that the file names include first values obtained by dividing the row locations by the row-directional set value and second values obtained by dividing the column locations by the column-directional set value.

2. The storage device of claim 1, wherein the at least one hardware processor is further configured to generate the files having location values of the segments for the surface scan image as a key and store the files.

3. The storage device of claim 1, wherein the image tiles include pieces of location information, and
    wherein the at least one hardware processor is further configured to generate the files having at least one of the pieces of location information of the plurality of image tiles constituting the segments as a key value and store the files.

4. The storage device of claim 1, wherein the at least one hardware processor is further configured to generate the files having location information of a specific image tile disposed at a set location of the segment as a file name and store the files.

5. The storage device of claim 1, wherein
each of the specific image tiles is disposed at a first left-uppermost location of each of the segments.

6. The storage device of claim 5, wherein the at least one hardware processor is further configured to set the row-directional set value and the column-directional set value to be the same.

7. The storage device of claim 1, wherein the files generated and stored by the at least one hardware processor have location values of specific image tiles as keys,
wherein the at least one hardware processor is further configured to:
search for and extract a specific file containing a defect image by using a key value; and
generate the defect image by using the extracted specific file.

8. The storage device of claim 1, wherein the at least one hardware processor is further configured to:
store the files in a memory; and
extract a specific file containing a defect image from the memory,
wherein the at least one hardware processor is further configured to:
when acquiring defect information containing a coordinate, extract a file from the memory, the extracted file having a file name containing a row defect location obtained by dividing a row-directional location of the coordinate by a row-directional set value and a column defect location obtained by dividing a column-directional location of the coordinate by a column-directional set value.

9. A storage device comprising:
at least one hardware processor,
wherein the at least one hardware processor is configured to:
acquire a surface scan image in a format of image tiles of a set size;
bind a set number of image tiles in one segment;
store a plurality of segments as files, respectively, instead of storing the image tiles without modification;
store the files in a memory; and
extract a specific file containing a defect image from the memory,
wherein the at least one hardware processor is further configured to:
when acquiring defect information containing a coordinate, extract a file from the memory, the extracted file having a file name containing a row defect location obtained by dividing a row-directional location of the coordinate by a row-directional set value and a column defect location obtained by dividing a column-directional location of the coordinate by a column-directional set value.

* * * * *